United States Patent
Byun et al.

(10) Patent No.: US 9,955,520 B2
(45) Date of Patent: Apr. 24, 2018

(54) METHOD FOR CONFIGURING DUAL CONNECTIVITY FOR TERMINAL BY BASE STATION IN WIRELESS COMMUNICATION SYSTEM AND APPARATUS FOR SAME

(71) Applicant: LG ELECTRONICS INC., Seoul (KR)

(72) Inventors: Daewook Byun, Seoul (KR); Insun Lee, Seoul (KR); Jian Xu, Seoul (KR); Kyungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 39 days.

(21) Appl. No.: 14/903,244

(22) PCT Filed: Jul. 7, 2014

(86) PCT No.: PCT/KR2014/006049
§ 371 (c)(1),
(2) Date: Jan. 6, 2016

(87) PCT Pub. No.: WO2015/005624
PCT Pub. Date: Jan. 15, 2015

(65) Prior Publication Data
US 2016/0143081 A1 May 19, 2016

Related U.S. Application Data

(60) Provisional application No. 61/843,421, filed on Jul. 7, 2013.

(51) Int. Cl.
*H04W 28/02* (2009.01)
*H04W 76/02* (2009.01)
(Continued)

(52) U.S. Cl.
CPC ......... *H04W 76/025* (2013.01); *H04W 16/32* (2013.01); *H04W 36/08* (2013.01);
(Continued)

(58) Field of Classification Search
CPC ..... H04W 16/32; H04W 36/08; H04W 36/16; H04W 36/28; H04W 76/02; H04W 88/06;
(Continued)

(56) References Cited

U.S. PATENT DOCUMENTS

2005/0130660 A1   6/2005  Park et al.
2011/0244866 A1*  10/2011 Yamamoto ............ H04W 36/22
                                                         455/438

(Continued)

FOREIGN PATENT DOCUMENTS

KR    10-1194031 B1    10/2012
WO    WO 2010/079960 A2    7/2010
(Continued)

OTHER PUBLICATIONS

Fukuta, Specification for "Mobile Communication System and User Terminal", Apr. 5, 2013, U.S. Appl. No. 61/808,794.*
(Continued)

*Primary Examiner* — Shukri Taha
*Assistant Examiner* — The Hy Nguyen
(74) *Attorney, Agent, or Firm* — Birch, Stewart, Kolasch & Birch, LLP

(57) ABSTRACT

The present invention relates to a method for configuring dual connectivity for a terminal by a base station in a wireless communication system and an apparatus for the same. The method for configuring the dual connectivity for the terminal by the base station in the wireless communication system according to an embodiment of the present invention comprises: receiving a service request message from a terminal connected to a first base station; transmit-
(Continued)

ting, to a second base station, a handover request message including a request for configuring dual connectivity with the terminal when the service request message includes a service that the first base station cannot support; and transmitting, to the terminal, a connectivity configuration message indicating connectivity between the terminal and the second base station on the basis of a handover response message received from the second base station in response to the handover request message.

9 Claims, 9 Drawing Sheets

(51) Int. Cl.
*H04W 16/32* (2009.01)
*H04W 36/28* (2009.01)
*H04W 36/08* (2009.01)
*H04W 36/16* (2009.01)
*H04W 88/06* (2009.01)

(52) U.S. Cl.
CPC ........... *H04W 36/16* (2013.01); *H04W 36/28* (2013.01); *H04W 76/02* (2013.01); *H04W 88/06* (2013.01)

(58) Field of Classification Search
CPC ..... H04W 36/00; H04W 40/24; H04W 28/00; H04W 40/36; H04Q 1/00; H04T 2001/217; H04B 7/18541

USPC .......................................... 455/403; 370/331
See application file for complete search history.

(56) References Cited

U.S. PATENT DOCUMENTS

| | | | |
|---|---|---|---|
| 2011/0287759 A1 | 11/2011 | Jung et al. | |
| 2012/0106511 A1 | 5/2012 | Wu | |
| 2014/0335882 A1* | 11/2014 | Lee ..................... | H04W 76/025 455/452.2 |
| 2016/0029376 A1* | 1/2016 | Fukuta .............. | H04W 72/0426 370/329 |

FOREIGN PATENT DOCUMENTS

| | | |
|---|---|---|
| WO | WO 2012/079197 A1 | 6/2012 |
| WO | WO 2012/173347 A2 | 12/2012 |

OTHER PUBLICATIONS

Fukuta, Drawings for "Mobile Communication System and User Terminal", Apr. 5, 2013, U.S. Appl. No. 61/808,794.*
Fukuta; Noriyoshi, Specification and Drawings, Provisional Application.*

* cited by examiner

METHOD FOR CONFIGURING DUAL CONNECTIVITY FOR TERMINAL BY BASE STATION IN WIRELESS COMMUNICATION SYSTEM AND APPARATUS FOR SAME

This application is the National Phase of PCT International Application No. PCT/KR2014/006049, filed on Jul. 7, 2014, which claims priority under 35 U.S.C. 119(e) to U.S. Provisional Application No. 61/843,421, filed on Jul. 7, 2013, all of which are hereby expressly incorporated by reference into the present application.

TECHNICAL FIELD

The present invention relates to a wireless communication system, and more particularly, to a method for a base station to configure dual connectivity of a user equipment in a wireless communication system and apparatus for the same.

BACKGROUND ART

Generally, a wireless communication system including a base station (BS) and a user equipment (UE) broadly provides various types of communication services including voice, data and the like to user devices through one or more base stations. And, a single base station may cover at least one or more cells.

In recent years, user equipment traffic has exploded due to the development of the wireless communication system. To handle the explosion of the user equipment traffic, the structure of the current wireless communication system has been changed from the conventional vertical structure corresponding to a centralized based station based on a macro base station or a macro cell into a structure in which various kinds of small cells such as a pico cell, a femto cell and the like are interconnected to the macro base station or the macro cell.

In small cell enhancements for E-UTRA and E-UTRAN as one of $3^{rd}$ generation partnership project (3GPP) standard scopes, a lot of discussion has been made on improvement of a scenario using low-power base stations such as a pico base station and a femto base station and a concept of dual connectivity for enabling a user equipment to connect with the macro cell and the small cell simultaneously.

Particularly, a small cell deployment scenario and requirements have been specified in TR 36.932. Moreover, additional functions and potential high layer technologies for improving the performance of E-UTRA and E-UTRAN and meeting the small cell deployment scenario and the requirements have been discussed in TR 36.842.

Meanwhile, the small cell as the low-power base station, for example, the pico or femto base station may receive a service request from the user equipment connected to the pico or femto base station and then provide corresponding service. However, in some cases, the pico or femto base station may not provide the service requested by the user equipment appropriately. Moreover, in this case, since the user equipment is not connected to the macro base station although it is connected to the pico or femto base station, the macro base station may not provide the service in place of the pico or femto base station. In particular, it may cause a problem that the user equipment connected to the small cell is unable to receive the service as much as it requests. Accordingly, a method of solving the above problem is required.

DISCLOSURE OF THE INVENTION

Technical Task

The present invention is made to solve the above-mentioned problem presented in the related art and one technical task of the present invention is to provide a method for a base station to configure dual connectivity of a user equipment in a wireless communication system.

Another technical task of the present invention is to provide a method of transmitting a request message for requesting to configure dual connectivity with a user equipment to a macro base station in case that a pico or femto base station connected to the user equipment is unable to provide service requested by the user equipment.

Another technical task of the present invention is to provide a method for a pico or femto base station to transmit a request message for requesting to configure dual connectivity with a user equipment to a macro base station in a manner of including an indicator or a cause value in the request message.

Further technical task of the present invention is to provide an apparatus for supporting the above-mentioned methods.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To solve the aforementioned technical problem, according to one embodiment of the present invention, a method of configuring dual connectivity of a user equipment by a first base station in a wireless communication system, the method comprising: receiving a service request message from a user equipment connected to the first base station; transmitting a handover request message including a request for configuring dual connectivity with the user equipment to the second base station when the service request message comprises a service unable to be supported by the first base station; and transmitting a connection configuration message for instructing connection between the second base station and the user equipment based on a handover response message received from the second base station in response to the handover request message.

To solve the aforementioned technical problem, the second base station corresponds to a macro base station and the first base station corresponds to either a femto base station or a pico base station.

To solve the aforementioned technical problem, a preset established connection between the first base station and the user equipment is detached before the user equipment performs the connection to the second base station, and dual connectivity with the user equipment is performed based on a connection request message received from the second base station for requesting connection to the user equipment after the user equipment performs the connection to the second base station.

To solve the aforementioned technical problem, the first base station provides a service comprised in the service request message to the user equipment together with the second base station after performing the dual connectivity with the user equipment.

To solve the aforementioned technical problem, the dual connectivity with the user equipment is performed based on the connection request message received from the second base station for requesting the connection to the user equipment, wherein the dual connectivity with the user equipment is performed after the second base station provides the service comprised in the service request message to the user equipment.

To solve the aforementioned technical problem, the connection configuration message transmitted to the second base station comprises information for instructing the user equipment to perform the connection to the second base station without detaching the preset established connection between the first base station and the user equipment.

To solve the aforementioned technical problem, the case that the service request message comprises the service unable to be supported by the first base station comprises a case that the first base station cannot support the service comprised in the service request message due to a load of the first base station.

To solve the aforementioned technical problem, the case that the service request message comprises the service unable to be supported by the first base station comprises a case that the service comprised in the service request message has QoS (quality of service) higher than QoS supportable by the first base station.

To solve the aforementioned technical problem, the request for configuring the dual connectivity with the user equipment included in the handover request message comprises an indicator or cause value for requesting a dual connectivity configuration with respect to a specific bearer.

To solve the aforementioned technical problem, an apparatus of configuring dual connectivity with a user equipment in a wireless communication system, the apparatus comprising: a radio frequency unit comprising a transmitting unit and a receiving unit; a processor configured to support communication of the apparatus connected to the transmitting unit and receiving unit, wherein the processor is further configured to: receive a service request message from a user equipment connected to the apparatus, transmit a handover request message including a request for configuring dual connectivity with the user equipment to a second base station when the service request message comprises a service unable to be supported by the apparatus, transmit a connection configuration message for instructing connection between the second base station and the user equipment based on a handover response message received from the second base station in response to the handover request message.

Advantageous Effects

According to the present invention, a base station can configure dual connectivity of a user equipment in a wireless communication system.

Moreover, according to the present invention, in case that a pico or femto base station connected to a user equipment is unable to provide service requested by the user equipment, the pico or femto base station can transmit a request message for requesting to configure dual connectivity with a user equipment to a macro base station.

Furthermore, according to the present invention, a pico or femto base station can transmit a request message for requesting to configure dual connectivity with a user equipment to a macro base station by including an indicator or a cause value in the request message.

Effects obtainable from the present invention are non-limited by the above-mentioned effects. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the detailed description serve to explain the principles of the invention. However, the technical features of the present invention may not be limited to a specific drawing and features disclosed in each of the drawings may be combined with each other to constitute a new embodiment. The reference numerals in each of the drawings mean the structural elements.

BEST MODE FOR INVENTION

Reference will now be made in detail to the preferred embodiments of the present invention, examples of which are illustrated in the accompanying drawings. In the following detailed description of the invention includes details to help the full understanding of the present invention. Occasionally, to avoid obscuring the concept of the present invention, structures and/or devices known to the public may be skipped or represented as block diagrams centering on the core functions of the structures and/or devices.

In this specification and the claims that follow, when it is described that one part "including or comprising" an element, unless specifically mentioned to the contrary, it may mean that the one part may further include other elements instead of excluding any other element.

Specific terminologies used for the embodiments of the present invention may be provided to help the understanding of the present invention. Unless differently defined, all terms used herein including the technical or scientific terms, have the same meanings as the terms generally understood by those skilled in the art to which the present invention pertains. Moreover, the use of the specific terminology may be modified into other forms within the scope of the technical idea of the present invention.

The terms such as 'first', 'second', etc. may be used to describe various components throughout this specification and the claims that follow but the elements should not be limited by the terms. The terms may be used only for discriminating one element from others.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Figure 1:
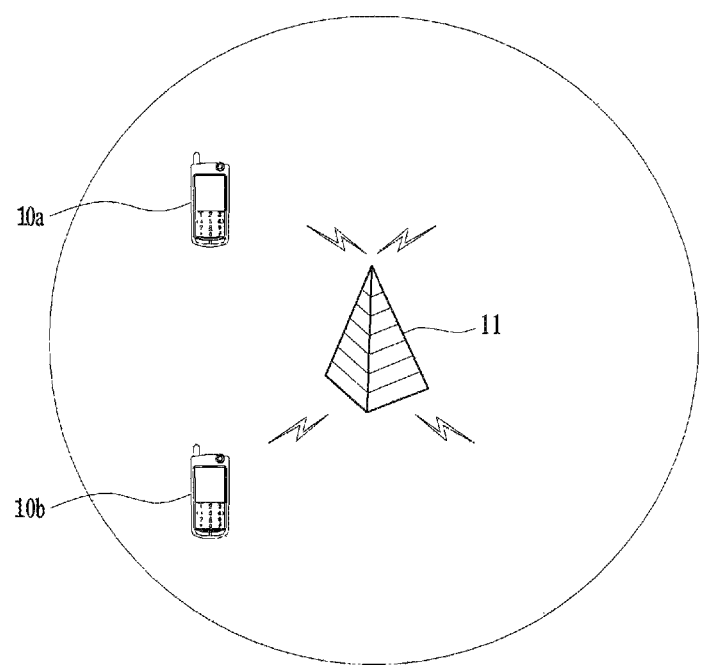
FIG. 1 is a diagram for an example of a general wireless communication system to which the present invention is applicable.

FIG. 1 is a diagram for an example of a general wireless communication system to which the present invention is applicable.

Referring to FIG. 1, a general wireless communication system to which the present invention is applicable may include a base station (BS) 11 and one or more user equipments (UEs) 10*a* and 10*b*.

In the present invention, the base station 11 may be meaningful as a terminal node of a network which directly performs communication with the user equipment 10*a* and 10*b*. Moreover, in the present invention, a specific operation explained as performed by the base station 11 may be performed by an upper node of the base station in some cases.

In particular, in a network constructed with a plurality of network nodes including the base station 11, it is apparent that various operations performed for communication with the user equipment can be performed by the base station or other network nodes except the base station.

In the present invention, 'base station 11' may be substituted with such a terminology as a fixed station, a Node B, an eNode B (eNB), an access point (AP) and the like. And, 'user equipment 10*a* and 10*b*' may be substituted with such a terminology as a user device, a terminal, a mobile station (MS), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device and the like.

The embodiments of the present invention may be implemented based on at least one of wireless access systems including IEEE system, 3GPP system, 3GPP LTE system, LTE-A (LTE-Advanced) system, and 3GPP2 system. And, at least one of them may be supported by the disclosed standard documents.

Figure 2:
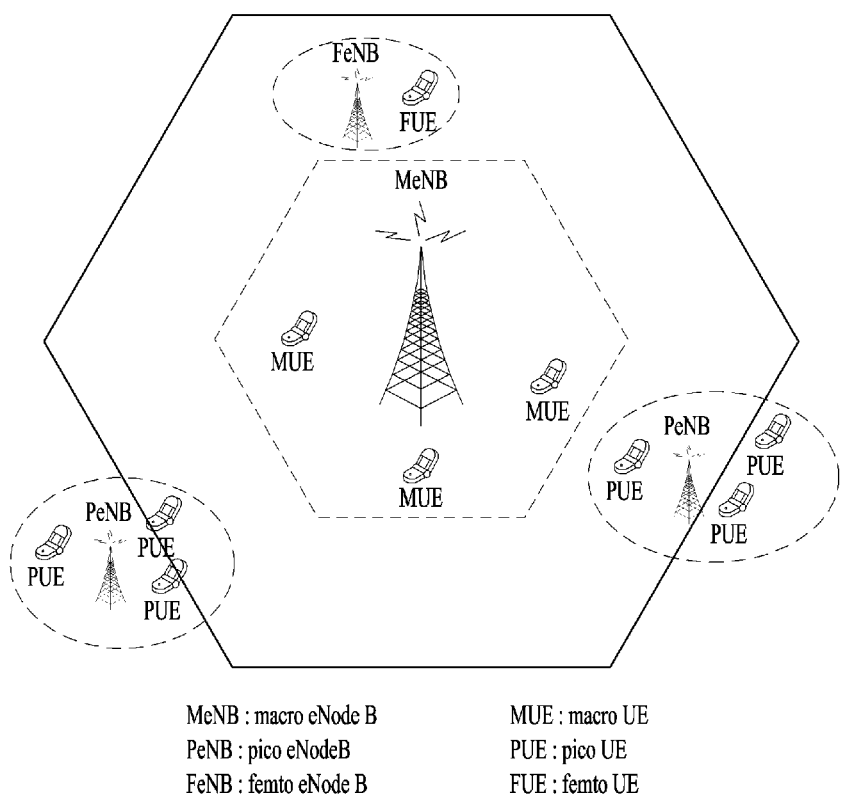
FIG. 2 is a diagram of a heterogeneous network environment to which the present invention is applicable.

FIG. 2 is a diagram of a heterogeneous network environment to which the present invention is applicable.

Since additional installation of a macro base station is inefficient in terms of cost and complexity in consideration of system performance improvement, in a next-generation wireless communication network, ongoing discussion has been made regarding a hierarchical cell structure or heterogeneous cell structure in which a small base station (e.g., pico or femto base station) for low-power/short-range communication coexist with a homogeneous network based on a macro base station in order to guarantee more stable data service such as multimedia service and handle explosion of user equipment traffic.

Meanwhile, a heterogeneous network structure considered for the wireless communication system may be implemented in the form as illustrated in FIG. 2. A plurality of small base stations may coexist in one macro base station and each of the small base stations serves user equipments in a manner of receiving allocated resources. And, the macro base station and each of the small base stations have coverage corresponding an area in which they can serve the user equipments.

However, there may be a case that only small base stations exist without the macro base station. Hereinafter, several scenarios sorted depending on locations of a macro base station and a small base station and presence or non-presence of them are described.

Figure 3:
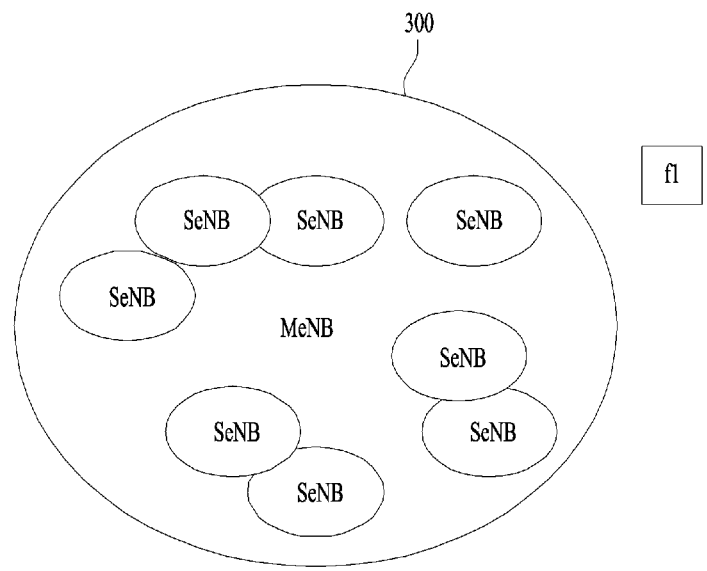
FIG. 3 is a diagram for a deployment scenario of a macro base station and a small base station to which the present invention is applicable.
Figure 4:
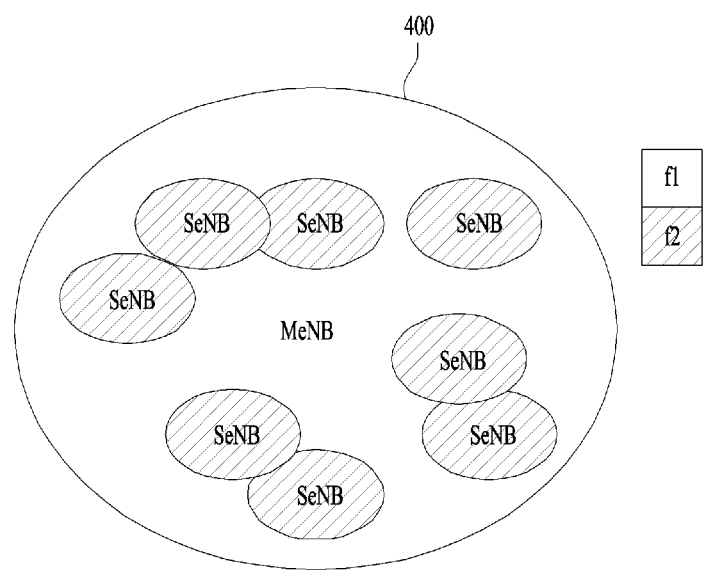
FIG. 4 is a diagram for a deployment scenario of a macro base station and a small base station to which the present invention is applicable.
Figure 5:
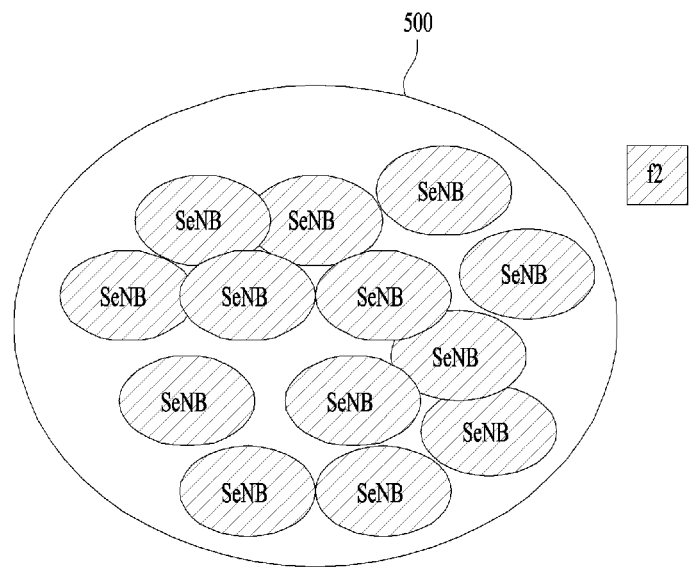
FIG. 5 is a diagram for a deployment scenario of a macro base station and a small base station to which the present invention is applicable.

FIGS. 3 to 5 are diagrams for deployment scenarios of a macro base station and a small base station to which the present invention is applicable In the current small base station related study item of 3GPP ($3^{rd}$ generation partnership project) Release 12, discussion is ongoing regarding the case that small base stations are deployed in coverage of a macro base station and the case that only small base stations exist in a specific area without a macro base station.

According to the discussion, a macro base station is defined as master eNB (MeNB) and a small base station is defined as a secondary eNB (SeNB). A backhaul link between the MeNB and the SeNB is considered as non-ideal and new Xn interface is defined between the two base stations.

There are three scenarios depending on whether a macro base station exist in an area in which small base stations are located and whether frequency used in a macro base station is equal to that used in a small base station. Each of the three scenarios is defined as follows.

First of all, according to a first scenario, a small base station is located in coverage of a macro base station and the same frequency is used in the two base stations as shown in FIG. 3.

Referring to FIG. 3, at least one of small base stations exist in the coverage 300 of the macro base station and the common frequency f1 is used in the macro base station and the small base stations.

According to a second scenario, a small base station is located in coverage of a macro base station and different frequencies are used in the two base station as shown in FIG. 4.

Referring to FIG. 4, at least one of small base stations exist in the coverage 400 of the macro base station. The macro base station uses frequency f1 and the small base stations use frequency f2. In particular, the frequency of the macro base station is different from that of the small base stations.

According to a third scenario, at least one of small base stations exist in a specific area without a macro base station as shown in FIG. 5.

Referring to FIG. 5, in the specific area 500, the macro base station does not exist but at least one of the small base stations exist only. And, all the small base stations uses the same frequency f2.

For the convenience of the explanation, the embodiment of the present invention is described based on the scenario in FIG. 4 among the scenarios mentioned with reference to FIGS. 3 to 5.

Figure 6:
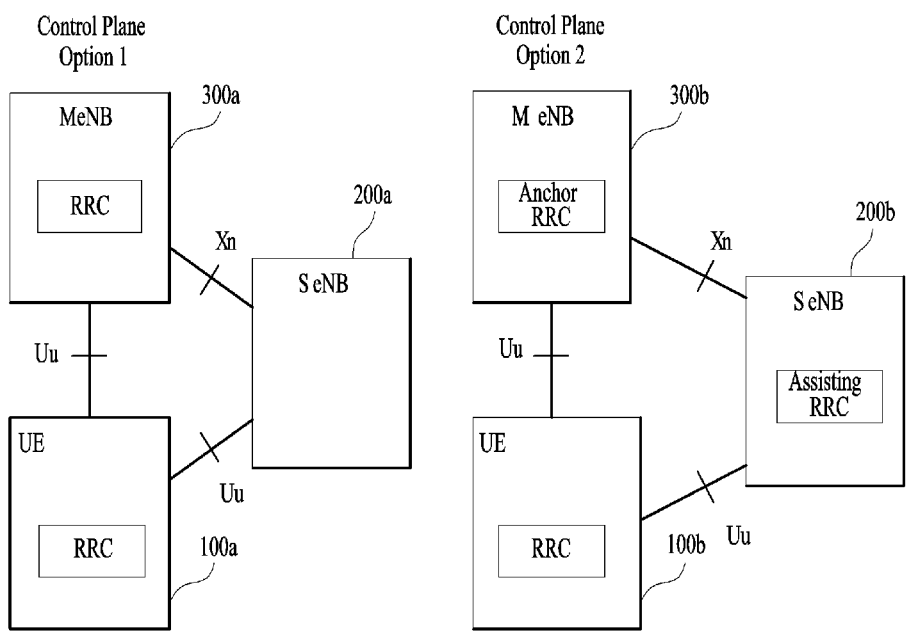
FIG. 6 is a diagram for an architecture of a radio resource control protocol to which the present invention is applicable.

FIG. 6 is a diagram for an architecture of a radio resource control protocol to which the present invention is applicable.

FIG. 6 illustrates an architecture of a radio resource control protocol, which a macro base station and a small base station can apply in order to support dual connectivity of a user equipment according to one embodiment of the present invention.

Here, a protocol means communication rules defined to facilitate information or data exchange between different objects or systems and a radio resource control protocol means communication rules defined to facilitate a radio resource control connection between different objects or systems.

Meanwhile, dual connectivity means a communication scheme of enabling a user equipment to use radio resources provided by at least two of different network nodes (e.g., MeNB and SeNB, or macro base station and small base station), which are connected to the user equipment through non-ideal backhaul, in a radio resource control (RRC) state.

For the convenience of the explanation, the present invention is described with reference to dual connectivity of a user equipment with a macro base station and a small base station. However, the present invention can be equally applied to various types of cells such as a macro cell, a micro cell, a pico cell, a femto cell and the like.

As shown in FIG. 6, the architecture of the radio resource control protocol, which can be applied to the macro base station and the small base station in order to support the dual connectivity of the user equipment, has two options. In the case of option 1 shown in the left side of FIG. 6, the RRC protocol for supporting the dual connectivity of the user equipment exist in only the macro base station.

In particular, the RRC protocol for supporting the dual connectivity does not exist in a small base station 200a but the RRC protocol exists in a user equipment 100a and a macro base station 300a.

On the contrary, in the case of option 2 shown in the right side of FIG. 6, the RRC protocol for supporting the dual connectivity of the user equipment exist in not only the macro base station but also the small base station.

In particular, the RRC protocol applicable to support the dual connectivity exists in not only a user equipment 100b and a macro base station 300b but also a small base station 200b. In the option 2, the macro base station 300b has RRC functions of working as an anchor but the small base station 200b has RRC functions of assisting unlike the macro base station 300b.

In this specification, for the convenience of the explanation, the embodiment of the present invention is described based on the option 2 of the options mentioned with reference to FIG. 6.

Figure 7:
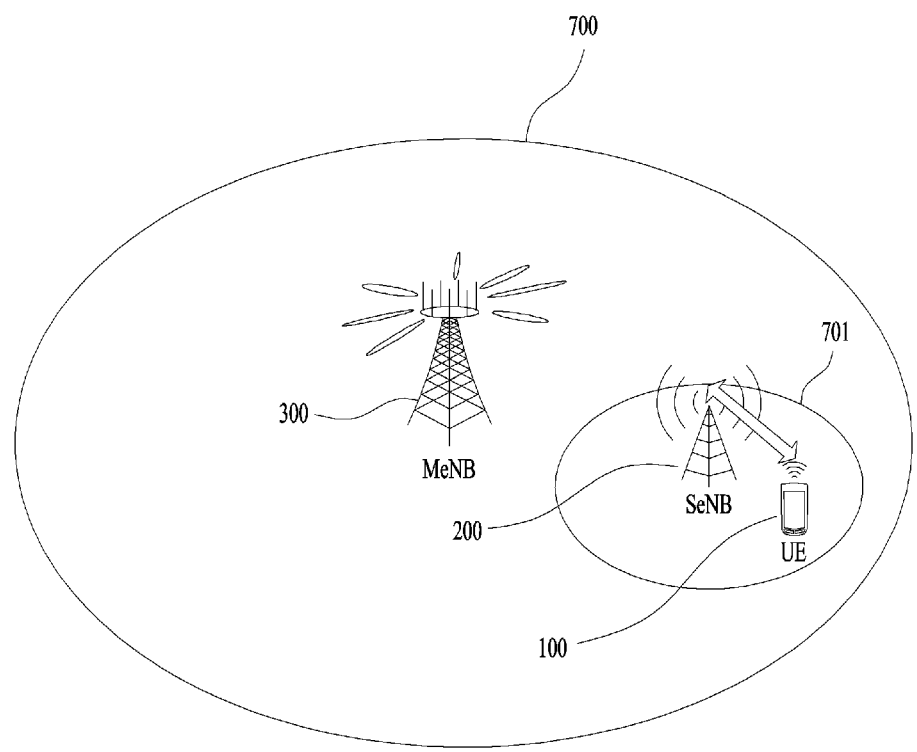
FIG. 7 illustrates an example of a situation in which a base station configures dual connectivity of a user equipment according to one embodiment of the present invention.

FIG. 7 illustrates an example of a situation in which a base station configures dual connectivity of a user equipment according to one embodiment of the present invention.

In FIG. 7, it is assumed that a user equipment 100 supporting dual connectivity moves around in coverage 700 of a macro base station 300 without connection to the macro base station 300 in idle mode. It is also assumed that after entering coverage 701 of a small base station 200, the user equipment 100 performs connection to the small base station 200 in the coverage 701 of the small base station 200.

If the small base station 200 corresponds to the above-mentioned small base station in the option 1, which has no RRC protocol for supporting the dual connectivity, the user equipment 100 in idle mode performs the connection by considering the small base station 200 as a conventional femto or pico base station since the small base station 200 needs to support backward compatibility basically.

In particular, since the user equipment 100 connected to the small base station 200 is unable to know whether the currently connected base station corresponds to a small base station, the user equipment 100 can transceive data through only the connected small base station 200.

On the other hand, in the case of the option 2, i.e., if the small base station 200 has the RRC protocol for supporting the dual connectivity, the user equipment 100 in idle mode recognizes a base station, to which the user equipment 100 will be connected, as the small base station 200 and then establishes the connection to the small base station 200.

Thus, in the case of the option 2, the user equipment 100 connected to the small base station 200 can transceive data through only the small base station 200 similar to the option 1. However, in this case, since the user equipment 100 has the dual connectivity, there may be a case that a high quality of service is demanded compared to single connectivity.

In this case, if the user equipment 100 requests a service of which a level cannot be handled by the small base station 200 alone or if the user equipment 100 requests service despite the situation that the small base station 200 is unable to provide a service, the small base station 200 may not satisfy the service requested by the user equipment 100 alone. Therefore, in this case, the macro base station (i.e., MeNB) 300 needs to support the small base station 200 to provide the service.

In particular, the macro base station 300 provides the service to the user equipment 100 together with the small base station or alone.

However, since the user equipment 100 is not currently connected to the macro base station 300, the user equipment may receive the service through only the connected small base station 200.

Thus, if the user equipment 100 requests the small base station 200 to provide a higher quality of a service or a service that cannot be provided by the small base station 200, it may cause a problem that the user equipment 100 is unable to receive the service as much as it requests since the user equipment 100 has no connection to the macro base station 300.

According to the one embodiment of the present invention, the above-mentioned problem can be solved in a manner that a small base station transmits a signal for configuring dual connectivity of a user equipment to a macro base station. Details will be explained in the following description.

Figure 8:
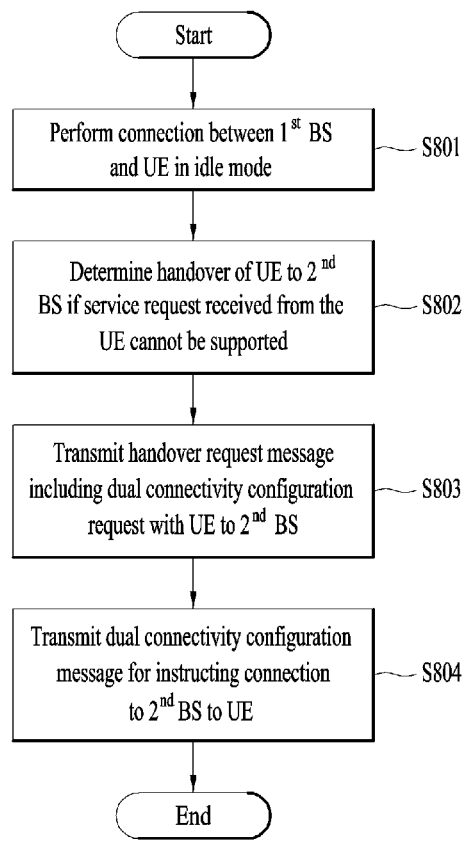
FIG. 8 is a flow diagram to describe a method for a base station to configure dual connectivity of a user equipment according to one embodiment of the present invention.

FIG. 8 is a flow diagram to describe a method for a base station to configure dual connectivity of a user equipment according to one embodiment of the present invention Referring to FIG. 8, a user equipment that supports dual connectivity moves around in coverage of a macro base station without connection to the macro base station in idle mode. After entering coverage of a small base station, the user equipment may perform connection to the small base station in the coverage of the small base station [S801].

The small base station may receive a service request from the connected user equipment. In this case, as mentioned in the foregoing description with reference to FIG. 7, if the corresponding user equipment requests a service of which a level cannot be handled by the small base station alone or if user equipment requests the service despite the situation that the small base station is unable to provide a service, it causes a problem that the small base station cannot satisfy the service requested by the user equipment alone.

In order to solve the above-mentioned problem, the small base station may determine handover of the user equipment to the macro base station so that the macro base station performs dual connectivity with the user equipment. According to the above determination, the small base station may transmit to the macro base station an X2 handover request message including an indicator or a cause value proposing to perform the dual connectivity with the user equipment [S802, S803]

Here, the service of which the level cannot be handled by the small base station alone means that quality of service (QoS) requested by the user equipment is higher than quality of service that can be provided by the small base station. And, the quality of service i.e., quality of communication service provided to the user equipment means a delay time equal to or shorter than a prescribed value or a level of compensating a data loss rate related to the corresponding communication service in a network. Such QoS may be previously defined in each service.

Moreover, the situation that the small base station is unable to provide the service means that that the amount of service provided by the small base station to different user equipments connected to the small base station is more than a predetermined fixed level or that the amount of data transmitted is more than a predetermined fixed level. In this case, if the small base station provides the service requested by the user equipment, load of the small base station becomes too high to provide the corresponding service.

Meanwhile, a request for proposing that the macro base station performs the dual connectivity with the user equipment may be included in the X2 handover request message. And, the request may be included in the X2 handover request message as a form of a separate predetermined indicator (or indication).

More particularly, the indicator may be included as a form of an indicator that requests the dual connectivity with respect to a specific bearer or as a form of the cause value and transmitted through X2 interface.

Here, X2 interface means an interface through which communication between base stations is performed in E-UTRAN (evolved UMTS terrestrial radio access network) of LTE system including a user equipment and a base station.

It is apparent that the request from the small base station, which proposes that the macro base station performs the dual connectivity with the user equipment, can be implemented as various forms including the above-mentioned forms using several methods.

Referring back to FIG. 8, having received the X2 handover request message, the macro base station determines whether it is able to perform the dual connectivity with the user equipment. If determining that the dual connectivity with the user equipment can be performed, the macro base station may transmit the result to the small base station in a manner of including it in an X2 handover response message or an X2 handover request acknowledge message.

Through the received X2 handover response message or X2 handover request acknowledge message, the small base station may know whether the macro base station is able to perform the dual connectivity with the user equipment.

If the macro base station can perform the dual connectivity with the user equipment, the small base station may transmit to the user equipment a connection configuration message for instructing connection to the macro base station 300 [S804].

Although not shown in FIG. 8, after the step S804, the user equipment may receive the requested service from the macro base station by performing the connection to the macro base station after having received the connection configuration message. Alternatively, the user equipment may receive the requested service through both of the macro base station and the small base station.

Meanwhile, the method mentioned in FIG. 8 can be applied to both of the option 1 and the option 2 mentioned in FIG. 6.

Figure 9:
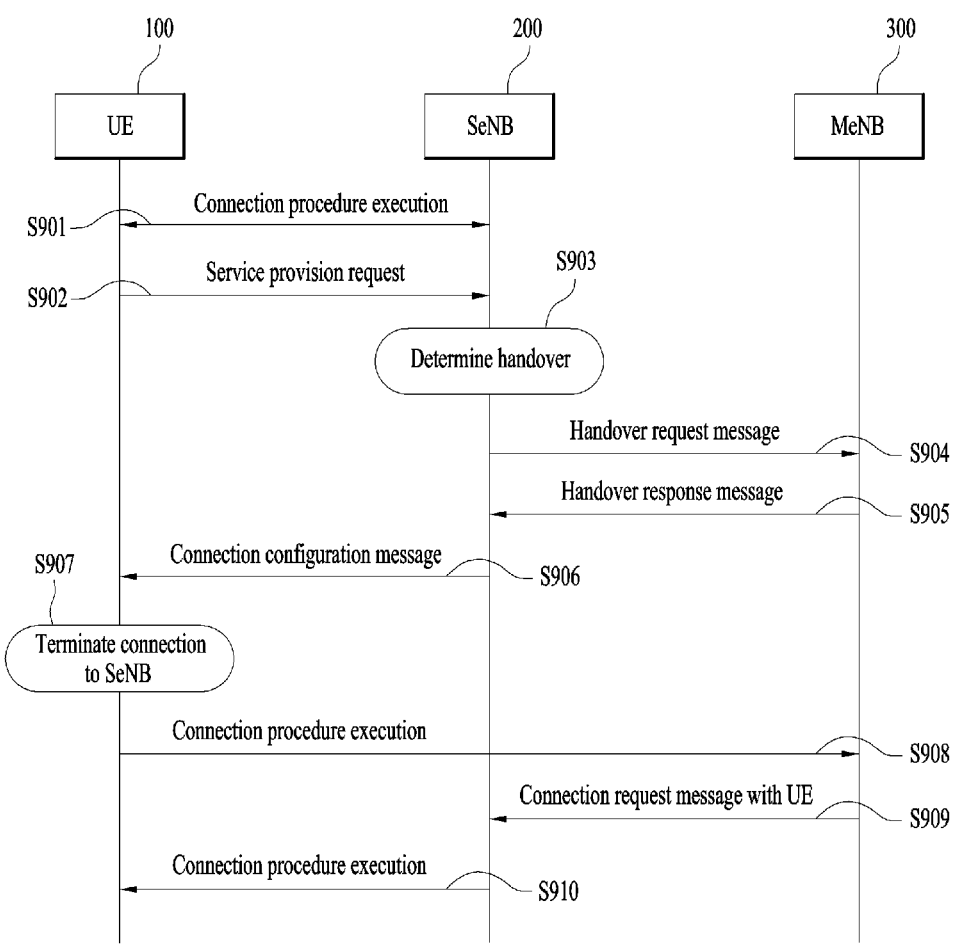
FIG. 9 illustrates an example of a method for a base station to configure dual connectivity of a user equipment according to one embodiment of the present invention.

FIG. 9 illustrates an example of a method for a base station to configure dual connectivity of a user equipment according to one embodiment of the present invention.

In FIG. 9, it is assumed that a user equipment 100 supporting dual connectivity moves around in coverage of a macro base station 300 without connection to the macro base station 300 in idle mode and that the user equipment 100 enters coverage of a small base station 200.

Referring to FIG. 9, the small base station 200 may perform a procedure for connection to the user equipment 100, which enters the coverage of the small base station 200, to enter a state for providing service and transceiving data [S901].

After a connection between the user equipment 100 and the small base station 200 is established through the step S901, the small base station 200 may receive a service provision request message for requesting a specific service provision from the user equipment [S902].

In this case, if the service included in the service provision request message corresponds to a service that can be provided by the small base station 200, the small base station 200 is able to provide the requested service to the user equipment 100. However, if the service requested by the user equipment 100 corresponds to a service of which a level cannot be handled by the small base station 200 alone or if the small base station 200 is in a situation that it is unable to provide a service, the small base station 200 is unable to satisfy the service requested by the user equipment 100. Thus, the small base station 200 may determine handover of the user equipment 100 to the macro base station 300 [S903].

Here, the service of which the level cannot be handled by the small base station 200 alone means that quality of service (QoS) requested by the user equipment 100 is higher than quality of service that can be provided by the small base station 200. And, the quality of service i.e., quality of communication service provided to the user equipment means a delay time equal to or shorter than a prescribed value or a level of compensating a data loss rate related to the corresponding communication service in a network. Such QoS may be previously defined in each service.

Moreover, the situation that the small base station 200 is unable to provide the service means that the amount of service provided by the small base station 200 to different user equipments connected to the small base station 200 is more than a predetermined fixed level or that the amount of data transmitted is more than a predetermined fixed level. In this case, if the small base station 200 provides the service requested by the user equipment 100, load of the small base station 200 becomes too high to provide the corresponding service.

Having determined the handover of the user equipment 100 to the macro base station 300 in the step S903, the small base station 200 may transmit to the macro base station 300 an X2 handover request message including an indicator (or indication) or a specific value (or cause value) that proposes to perform dual connectivity with the user equipment 100 [S904].

A request for proposing that the macro base station 300 performs the dual connectivity with the user equipment 100 may be included in the X2 handover request message. And, the request may be included in the X2 handover request message as a form of a separate predetermined indicator (or indication).

More particularly, the indicator may be included as a form of an indicator that requests the dual connectivity with respect to a specific bearer or as a form of the specific value (or cause value) and transmitted through X2 interface.

Meanwhile, having received the X2 handover request message through the step S904, the macro base station 300 determines whether it is able to perform the dual connectivity with the user equipment 100 by considering the specific bearer(s) requested through the X2 handover request message and bearers that can be provided by the macro base station 300.

If determining that the dual connectivity with the user equipment can be performed, the macro base station 300 may transmit an indicator for indicating the result to the small base station 200 in a manner of including the indicator in an X2 handover response message or an X2 handover request acknowledge message [S905].

Through the X2 handover response message or X2 handover request acknowledge message received in the step S905, the small base station 200 may know whether the macro base station 300 is able to perform the dual connectivity with the user equipment 100.

If the macro base station 300 can perform the dual connectivity with the user equipment 100, the small base station 200 may transmit to the user equipment 100 a connection configuration message for instructing connection to the macro base station 300 [S906].

In this case, according to one embodiment of the present invention, the user equipment 100 that receives the connection configuration message and the small base station 200 currently connected to the user equipment 100 may release a previously established connection between the user equipment 100 and the small base station 200 (i.e., may be detached from each other) before the user equipment 100 performs a procedure for connection to the macro base station 300 [S907].

Subsequently, the macro base station 300 performs the procedure for the connection to the user equipment 100, which has been detached from the small base station 200. After establishing the connection to the user equipment 100, the macro base station 300 may transmit to the small base station 200 a connection request message for requesting connection to the user equipment 100 [S909].

Here, the connection request message may correspond to a message for requesting the small base station 200 to perform dual connectivity by performing the connection to the user equipment 100 currently connected to the macro base station 300. And, the message may be transmitted as a form of a small-cell addition message.

Meanwhile, having received the connection request message in the step S909, the small base station 200 may perform a procedure for the connection with the user equipment 100 currently connected to the macro base station 300 [S910].

Although not shown in FIG. 9, the macro base station 300 and the small base station 200 provide the service request by the user equipment 100 together. Moreover, different from the above description, the macro base station 300 may provide the service requested by the user equipment 100 to the user equipment 100 immediately after establishing the connection to the user equipment 100 and then perform the step S909.

Figure 10:
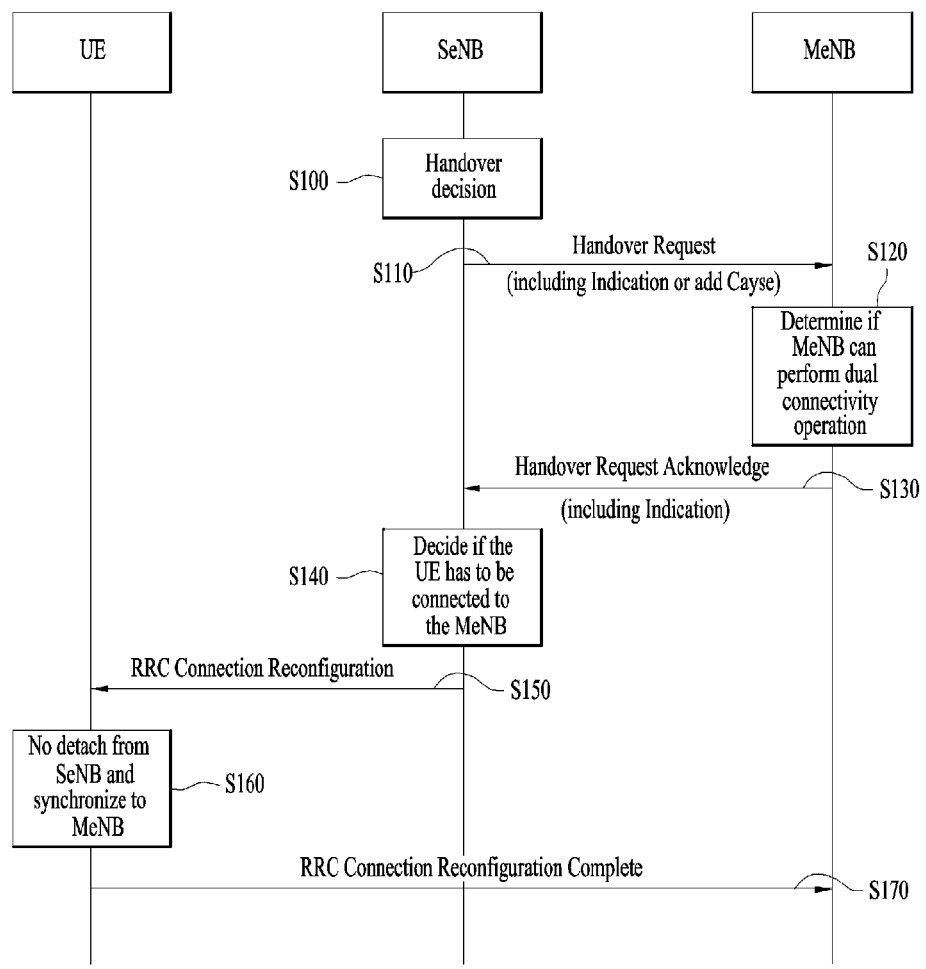
FIG. 10 illustrates an example of a method for a base station to configure dual connectivity of a user equipment according to one embodiment of the present invention.

FIG. 10 illustrates an example of a method for a base station to transmit a signal for configuring dual connectivity of a user equipment according to one embodiment of the present invention.

In FIG. 10, it is assumed that a user equipment 100 supporting dual connectivity moves around in coverage of a macro base station 300 without connection to the macro base station 300 in idle mode and that the user equipment 100 is connected to a small base station 200 after entering coverage of the small base station 200. In addition, it is also assumed that the small base station 200 receives a service provision request message for requesting a specific service provision from the user equipment 100.

Referring to FIG. 10, the small base station 200 may determine handover of the user equipment to the macro base station 300 [S100].

In this case, if a service requested by the user equipment 100 corresponds to a service of which a level cannot be handled by the small base station 200 or if the small base station 200 is put in a situation that it is unable to provide a service, the handover of the user equipment 100 to the macro base station 300 may be determined.

Moreover, the service of which the level cannot be handled by the small base station alone means that quality of service (QoS) requested by the user equipment is higher than quality of service that can be provided by the small base station. And, the quality of service i.e., quality of communication service provided to the user equipment means a delay time equal to or shorter than a prescribed value or a level of compensating a data loss rate related to the corresponding communication service in a network. Such QoS may be previously defined in each service.

Furthermore, the situation that the small base station is unable to provide the service means that the amount of service provided by the small base station to different user equipments connected to the small base station is more than a predetermined fixed level or that the amount of data transmitted is more than a predetermined fixed level. In this case, if the small base station provides the service requested by the user equipment, load of the small base station becomes too high to provide the corresponding service.

In particular, the small base station 200 may know that the user equipment supports dual connectivity, based on capability information of the user equipment 100 connected to the small base station 200. If the user equipment 100 requests a high quality of a service to the small base station 200, the small base station 200 may determine the handover in the above-mentioned step S100 so that the macro base station 300 performs the dual connectivity.

Having determined the handover of the user equipment 100 to the macro base station 300 in the step S100, the small base station 200 may transmit to the macro base station 300 an X2 handover request message including an indicator (or indication) or a specific value (or cause value) that proposes to perform the dual connectivity with the user equipment 100 [S110].

A request for proposing that the macro base station 300 performs the dual connectivity with the user equipment 100 may be included in the X2 handover request message. And, the request may be included in the X2 handover request message as a form of a separate predetermined indicator (or indication).

More particularly, the indicator may be included as a form of an indicator that requests the dual connectivity with respect to a specific bearer or as a form of the specific value (or cause value) and transmitted through X2 interface.

Meanwhile, having received the X2 handover request message through the step S110, the macro base station 300 may know that the small base station 200 requests it to perform the dual connectivity with the user equipment 100 through the received indicator or specific value (or cause value).

Thus, the macro base station 300 determines whether the dual connectivity can be performed by considering the specific bearer(s) requested through the X2 handover request message and bearers that can be provided by the macro base station 300 [S120].

If determining that the dual connectivity can be performed, the macro base station 300 may transmit an indicator for indicating the result to the small base station 200 in a manner of including the indicator in an X2 handover response message or an X2 handover request acknowledge message [S130].

Through the X2 handover response message or X2 handover request acknowledge message received in the step S130, the small base station 200 may know whether the macro base station 300 is able to perform the dual connectivity with the user equipment 100. And, the small base station 200 may determine whether the corresponding user equipment 100 is connected to the macro base station 300 [S140].

If the macro base station 300 can perform the dual connectivity with the user equipment 100, the small base station 200 may transmit to the user equipment 100 a connection configuration message for instructing connection to the macro base station 300. In this case, the connection configuration message may include an indicator for instructing the user equipment 100 to establish the connection to the macro base station without releasing the connection to (i.e., being detached from) the small base station 200 [S150, S160].

Moreover, the connection configuration message may be transmitted as a form of a radio resource control connection reconfiguration message.

Meanwhile, having received the connection configuration message in the step S150, the user equipment 100 may perform a procedure for the connection to the macro base station 300 without releasing the connection to the small base station 200. In this case, the user equipment 100 may transmit a radio resource control (RRC) connection reconfiguration complete message to inform that RRC connection to the macro base station 300 is successfully performed [S170].

Although not shown in FIG. 10, after performing the connection to the macro base station 300 in the step S170, the user equipment 100 may receive the requested service from the macro base station 300. Alternatively, the user equipment 100 may receive the requested service through both of the macro base station 300 and the small base station 200.

Figure 11:
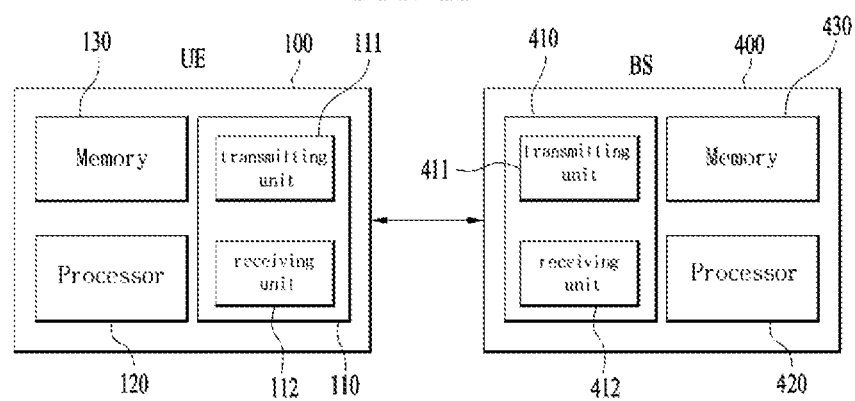
FIG. 11 is a block diagram for an example of an apparatus for configuring dual connectivity of a user equipment according to one embodiment of the present invention.

FIG. 11 is a block diagram for an example of an apparatus for configuring dual connectivity of a user equipment according to one embodiment of the present invention.

Referring to FIG. 11, a wireless communication system to which the present invention is applicable may include a user equipment 100 and a base station 400. And, it is assumed that the base station 400 corresponds to a concept of including both of the small base station and the macro base station mentioned in the foregoing description with reference to FIGS. 1 to 10.

The base station 400 may include a radio frequency (RF) unit 410, which includes a transmitting unit 411 and a receiving unit 412, a processor 420 and a memory 430.

Overall communication processes of the base station 400 including signal processing, layer processing and the like are controlled by the processor 420 and the memory 430. Moreover, connection relations may be formed between the RF unit 410, the processor 420 and the memory 430.

The RF unit 410 included in the base station 400 may include the transmitting unit 411 and the receiving unit 412. The transmitting unit 411 and the receiving unit 412 may be configured to transceive signals with the user equipment 100 or other base stations.

The processor 420 is functionally connected to the transmitting unit 411 and the receiving unit 412 in the RF unit 410 and may be configured to control processes for the transmitting unit 411 and the receiving unit 412 to transceive the signals with the user equipment 100 and other base stations. And, the processor 420 may perform various processing on a signal to be transmitted and then transmits the signal to the transmitting unit 411. Moreover, the processor 420 may perform processing on a signal received by the receiving unit 412.

If necessary, the processor 420 can save information included in an exchanged message in the memory 430. The base station 400 may perform the above-mentioned various embodiments of the present invention based on the aforementioned structure.

An RF unit 110, which includes a transmitting unit 111 and a receiving unit 112, of the user equipment 100 may be configured to transceive signals with the base station 400. A processor 120 of the user equipment 100 is functionally connected to the transmitting unit 111 and the receiving unit 112 and may be configured to control processes for the transmitting unit 111 and the receiving unit 112 to transceive signals with other devices including the base station 400.

And, the processor 120 performs various processing on a signal to be transmitted and then transmits the signal to the transmitting unit 411. Moreover, the processor 220 may perform processing on a signal received by the receiving unit 412.

If necessary, the processor 120 can save information included in an exchanged message in a memory 130.

The processor 120 of the user equipment 100 instructs (e.g., controls, adjusts, manages, etc.) operations of the user equipment 100. And, the processor 420 of the base station 200 instructs (e.g., controls, adjusts, manages, etc.) operations of the base station 400. The processor 120/420 may be connected to the memory 130/430 capable of storing program codes and data. The memory 130/430 may store an operating system, an application and general files in a manner of being connected to the processor 120/420.

The processor 120/420 of the present invention may be referred to as a controller, a microcontroller, a microprocessor, a microcomputer or the like. Meanwhile, the processor 120/420 may be implemented using hardware, firmware, software and/or any combinations thereof.

In case of the implementation by firmware or software, one embodiment of the present invention may be implemented by modules, procedures, and/or functions for performing the above-explained functions or operations. Software code may be stored in the memory 130/430 and may be then driven by the processor 120/420. The memory 130/430 may be provided within or outside the user equipment 100/the base station 400 to exchange data with the processor 120/420 through the various means known to the public.

In case of the implementation using hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays) and the like installed in the processor 120/420.

Meanwhile, the aforementioned method can be written as computer programs and can be implemented in general-use digital computers that execute the programs using a computer readable recording medium. And, a data structure used for the aforementioned method can be recorded by various means in a computer-readable media. Program storing devices usable for explaining a storing device, which includes an executable computer code configured to perform various methods of the present invention, should not be understood as a device including such temporary objects as carrier waves and signals. The computer-readable media includes such a storing media as a magnetic storing media (e.g., a ROM, a floppy disk, a hard disk and the like) and an optical reading media (e.g., a CD-ROM, a DVD and the like).

It will be apparent to those skilled in the art that various modifications and variations can be made therein without departing from the spirit and scope of the invention. The disclosed embodiments should be considered in a descriptive sense only and not for purposes of limitation. Thus, it is intended that the present invention covers the modifications and variations of this invention that come within the scope of the appended claims and their equivalents.

INDUSTRIAL APPLICABILITY

A method for a base station to configure dual connectivity of a user equipment according to the present invention can be applied to various kinds of wireless communication systems.

What is claimed is:

1. A method of configuring dual connectivity of a user equipment by a small base station in a wireless communication system, the method comprising:
    receiving a service request message from a user equipment connected to the small base station;
    transmitting a handover request message including a request for configuring dual connectivity with the user equipment to a macro base station when the small base station is unable provide a service requested by the service request message; and
    transmitting a connection configuration message for instructing a connection between the macro base station and the user equipment based on a handover response message received from the macro base station in response to the handover request message,
    wherein the request for configuring the dual connectivity with the user equipment included in the handover request message comprises cause value for requesting a dual connectivity configuration with respect to a specific bearer.

2. The method of claim 1, wherein the small base station corresponds to either a femto base station or a pico base station.

3. The method of claim 1, wherein a preset established connection between the small base station and the user equipment is detached before the user equipment performs the connectivity with the user equipment is performed based on a connection request message received from the macro base station for requesting a connection to the user equipment after the user equipment performs the connection to the macro base station.

4. The method of claim 3, wherein the small base station provides a service comprised in the service request message to the user equipment together with the macro base station after performing the dual connectivity with the user equipment.

5. The method of claim 3, wherein the dual connectivity with the user equipment is performed based on the connection request message received from the macro base station for requesting the connection to the user equipment, and
    wherein the dual connectivity with the user equipment is performed after the macro base station provides the service comprised in the service request message to the user equipment.

6. The method of claim 3, wherein the connection configuration message transmitted to the macro base station comprises information for instructing the user equipment to perform the connection to the macro base station without detaching the preset established connection between the small base station and the user equipment.

7. The method of claim 1, wherein a case that the service request message comprises the service unable to be supported by the small base station comprises a case that the small base station cannot support the service comprised in the service request message due to a load of the small base station.

8. The method of claim 1, wherein a case that the service request message comprises the service unable to be supported by the small base station comprises a case that the service comprised in the service request message has QoS (quality of service) higher than QoS supportable by the small base station.

9. An apparatus of configuring dual connectivity with a user equipment in a wireless communication system, the method comprising:
    a radio frequency transceiver comprising a transmitting transceiver and a receiving transceiver;
    a processor configured to support communication of the apparatus connected to the transmitting transceiver and receiving transceiver;
    wherein the processor is further configured to:
        receive a service request message from a user equipment using the receiving transceiver,
        transmitting a handover request message including a request for configuring dual connectivity with the user equipment to a macro base station using the transmitting transceiver when the apparatus is unable to provide a service requested by the service request message, and
        transmit a connection configuration message for instructing a connection between the macro base station and the user equipment based on a handover response message received from the macro base station in response to the handover request message using the transmitting transceiver, and
    wherein the request for configuring the dual connectivity with the user equipment included in the handover request message comprises cause value for requesting a dual connectivity configuration with respect to a specific bearer.

* * * * *